UNITED STATES PATENT OFFICE.

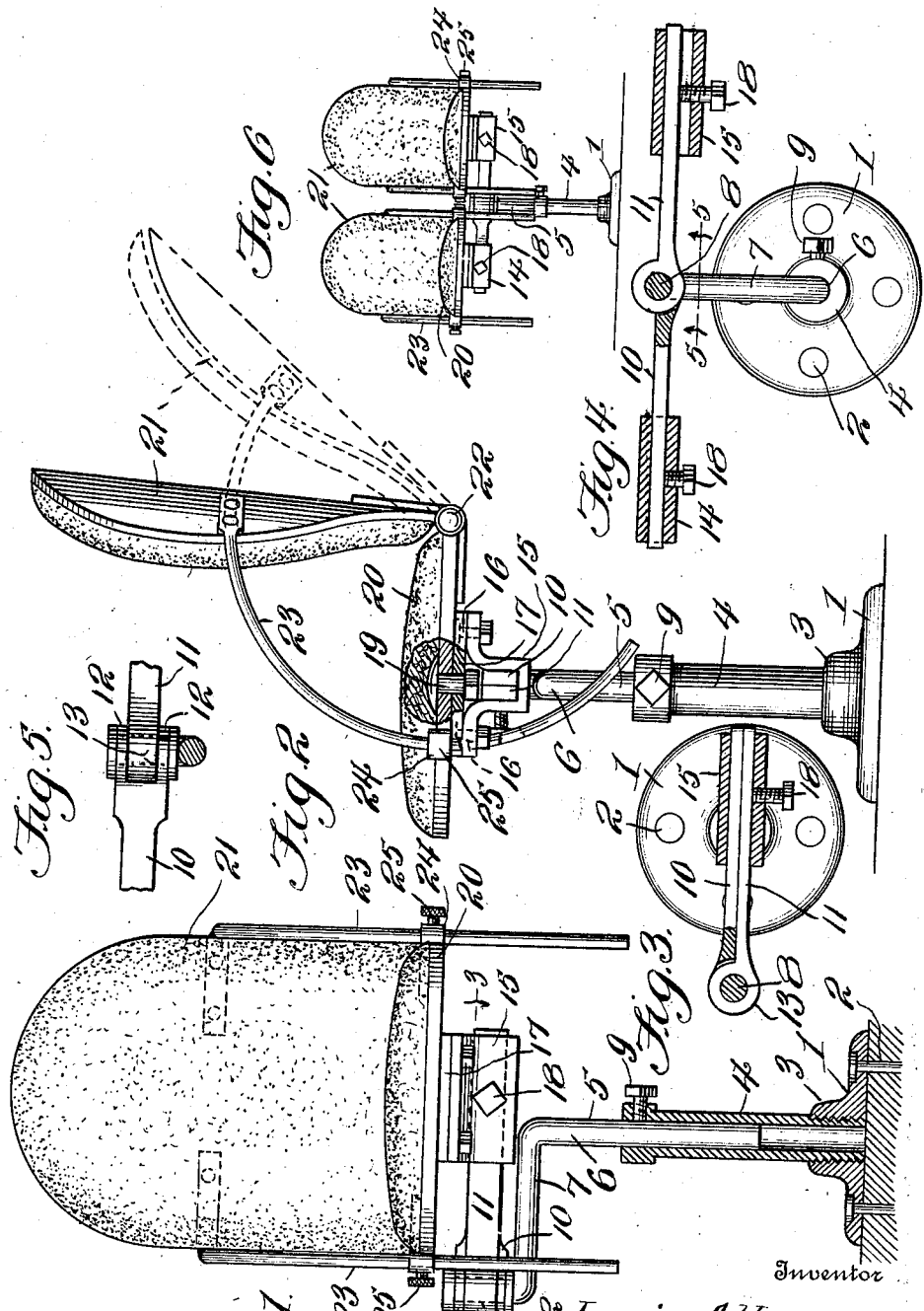

LOUISE A. HAZEN, OF FAIRFIELD TOWNSHIP, CRAWFORD COUNTY, PENNSYLVANIA.

AUXILIARY VEHICLE-SEAT.

1,015,799.  Specification of Letters Patent.  Patented Jan. 30, 1912.

Application filed November 7, 1911. Serial No. 658,977.

*To all whom it may concern:*

Be it known that I, LOUISE A. HAZEN, a citizen of the United States, residing in Fairfield township, in the county of Crawford and State of Pennsylvania, have invented certain new and useful Improvements in Auxiliary Vehicle-Seats, of which the following is a specification.

The invention relates to an improvement in auxiliary seats, and is particularly directed to a construction where one or more auxiliary seats may be quickly and conveniently applied for use in an automobile, sleigh, buggy, or other vehicle, to increase the seating capacity of such vehicle beyond that incident to the usual fixed seats.

The main object of the present invention is the provision of an auxiliary seat structure, including a supporting member, adapted for removable connection with the vehicle, and arranged for vertical or rotative adjustment, the supporting member carrying freely swinging seat bars, adapted when together to support a single seat and when spaced to support a plurality of seats.

The invention will be described in detail in the following specification, reference being had particularly to the accompanying drawings, in which:

Figure 1 is a view in elevation partly in section of the improvement, the device being shown particularly for supporting a single seat. Fig. 2 is a side elevation, partly in section, of the same. Fig. 3 is a section on line 3—3 of Fig. 1. Fig. 4 is a horizontal section on a line corresponding to line 3—3 of Fig. 1, but showing the arms extended and supporting two seats. Fig. 5 is a section on line 5—5 of Fig. 4. Fig. 6 is a rear elevation of the structure showing two seats, supported thereby.

Referring particularly to the accompanying drawings, wherein is illustrated the preferred form of details, 1, represents a base plate, permanently secured, as by bolts or other fastenings, 2 to the body of the vehicle, at an appropriate point with relation to the other or permanent seats. The base plate is formed with an upstanding boss, interiorly threaded for the removable connection thereto of a socket member 4.

A supporting member 5, is designed for removable connection with the socket member, said supporting member being preferably circular in cross section and including a vertical portion 6, a horizontal portion 7, projecting laterally from the upper end of the vertical portion, and a second vertical or pivot portion 8, projecting from the free end of the horizontal portion. The vertical portion 6 of the supporting member is arranged for rotary and vertical adjustment within the socket member, being adapted however to be fixed in any desired position of such adjustments through the medium of a set screw, or clamp band 9.

Mounted upon the pivot section 8 of the supporting member are the seat arms 10 and 11, one of said arms, as 10, having spaced ears 12 engaging the pivot, while the other of said arms has a sleeve terminal 13 engaging the pivot between the ears 12. By this construction the seat arms are adapted for independent movement on the pivot, and at the same time may if desired be folded together to present a single arm as shown in Fig. 3, and for a purpose which will later appear.

Seat carriers, 14 and 15, are arranged for coöperation at the arms, said carriers each including a pivot plate 16, and an arm sleeve 17, secured to and depending from the plate. The arm sleeve has an interior opening conforming to the angular contour of the arm, the opening of sleeve 14 being of a size to receive the single arm only, while the opening in the sleeve of the seat carrier 15 is of a size to receive both arms when in folded relation. A set screw 18 coöperates with the sleeve of each seat carrier, whereby said seat carrier may be secured in any position lengthwise of the arm, or wholly removed from the same. The set screw of the sleeve of seat carrier 15 is of such length as to effectively lock said carrier when coöperating with a single arm only, as will be evidenced from Fig. 4.

A chair is connected with each seat carrier, preferably through the medium of a pivot pin 19 properly secured in the seat bottom and in the plate 16 of the seat carrier. The chair is thus pivotally connected with the seat carrier, and capable of free rotary movement thereon. The seat section 20 of the chair, which may be of any appropriate size and upholstered and finished as desired is provided with a back 21, hingedly connected at 22, as shown in Fig. 2. Curved arms 23 are secured to the back, and extend therefrom through sockets 24 projecting from the seat section, set screws 25 engaging the arms to secure the back at any desired inclination with relation to the seat.

In the use of the device the socket member 4 is first applied to the base plate and the supporting member 5 disposed in the socket member and secured in desired adjustment as to height and radial position of the pivot portion. If there is necessity for two auxiliary seats the arms 10 and 11 are spread apart in the position shown in Fig. 4 and both seat carriers applied as shown. If but one seat is desired the arms are folded together as shown in Fig. 3, and the single seat carrier 15, and accompanying chair applied as illustrated.

It will be obvious that by the use of the auxiliary seats, the seating capacity of a vehicle may be increased over the normal; that the occupant of such auxiliary seat or seats may arrange such seat in practically any position with respect to the travel of the vehicle or the other occupants; but when in use the auxiliary seat may be turned, while occupied, to face temporarily any direction, and thereby materially increasing the convenience of such seat; that the device would readily accommodate one or two seats as desired; that any desired inclination may be given the back for the convenience of the user; and that the entire device may be readily and quickly removed from the vehicle when not wanted for use.

Having thus described my invention, what I claim is:

1. An auxiliary seat including a supporting member and seat arms pivotally connected to said member, said arms being adapted to be folded together, to support a single seat, and to be spread apart to provide a plurality of seat supports.

2. An auxiliary seat for vehicles including a supporting member, means for adjustably connecting said member to the vehicle, independent arms pivotally connected to the supporting member, and seat carriers coöperating respectively with said arms, one of said carriers being of a size to coöperate with both of said arms when folded together.

3. An auxiliary seat for vehicles including independent seat arms, means for supporting said arms in adjusted position with relation to the vehicle, and seat carriers coöperating with said arms, said arms being adapted to be folded to present a single arm, or spread to present a plurality of arms, and one of said carriers being adapted to coöperate with both arms when folded.

In testimony whereof, I affix my signature in presence of two witnesses.

LOUISE A. HAZEN.

Witnesses:
 FLORENCE A. HOUSTON,
 NANNIE F. MONDEREAN.